United States Patent
Ukita et al.

(10) Patent No.: US 6,877,776 B2
(45) Date of Patent: Apr. 12, 2005

(54) PRETENSIONER DEVICE

(75) Inventors: Masaru Ukita, Aichi-ken (JP);
Kazuhiko Aihara, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 147 days.

(21) Appl. No.: 10/291,814

(22) Filed: Nov. 12, 2002

(65) Prior Publication Data

US 2003/0122362 A1 Jul. 3, 2003

(30) Foreign Application Priority Data

Nov. 13, 2001 (JP) ........................................ 2001-347173

(51) Int. Cl.$^7$ ............................................. B60R 22/46
(52) U.S. Cl. ................................................... 280/806
(58) Field of Search ........................... 280/806; 297/480

(56) References Cited

U.S. PATENT DOCUMENTS

| | | | | |
|---|---|---|---|---|
| 5,671,949 A | * | 9/1997 | Bauer et al. ............... | 280/806 |
| 5,887,897 A | * | 3/1999 | Gill et al. ................. | 280/806 |
| 6,039,353 A | * | 3/2000 | Bauer et al. ............... | 280/806 |
| 6,250,682 B1 | | 6/2001 | Betz et al. | |

FOREIGN PATENT DOCUMENTS

| | | | | |
|---|---|---|---|---|
| DE | 2408173 | * | 9/1974 | ............... 280/806 |
| JP | 5-193446 | | 8/1993 | |

* cited by examiner

*Primary Examiner*—Eric Culbreth
(74) *Attorney, Agent, or Firm*—Nixon Peabody LLP

(57) ABSTRACT

A pretensioner device in which, at a time of rapid deceleration of a vehicle such as a collision, a gas generator generates gas and the pretensioner device moves a piston in a direction of tensing a webbing. When, due to delayed detection by an acceleration sensor, the gas generator operates after a stretch-out load has been applied to a wire, high-pressure and high-temperature gas within a gas chamber contacts a guard pipe, which is formed of a material having a high thermal conductivity and is disposed within the gas chamber, and is cooled, and passes through a clearance and a pin hole communicating regions to a front and rear of the piston, and is discharged into a cylinder.

21 Claims, 5 Drawing Sheets

PRETENSIONER DEVICE

BACKGROUND OF THE INVENTION

1. Field of the Invention

The present invention relates to a pretensioner device which is used in a seat belt device for a vehicle. The pretensioner device is a device which, at the time of rapid deceleration of a vehicle or the like, decreases the amount of movement of the waist portion of a vehicle occupant to which a webbing for restraining a vehicle occupant is applied, by pulling-in a buckle or an anchor plate.

2. Description of the Related Art

Among seat belt devices for vehicles, there are three-point seat belt devices using a continuous webbing.

In this type of seat belt device, one end portion of the webbing is anchored to a take-up device (retractor), the intermediate portion of the webbing passes through a through-anchor fixed to the upper portion of the center pillar, and the other end portion of the webbing is anchored on an anchor plate. A tongue plate is disposed at the intermediate portion of the webbing between the anchor plate and the through-anchor. By anchoring the tongue plate in a buckle device disposed at the side of a seat, the webbing is pulled out from the retractor and applied to the vehicle occupant.

In this state, the shoulder webbing, which is from the through-anchor to the tongue plate (the buckle device), restrains the upper body of the vehicle occupant, whereas the lap webbing, which is from the tongue plate to the anchor plate, restrains the waist portion of the vehicle occupant. Among such seat belt devices, there are those which are provided with a lap pretensioner device for tensing, in the direction of restraining the vehicle occupant, the webbing at the time of a rapid deceleration of the vehicle, such as at the time of a collision or the like.

This type of lap pretensioner device is formed to include a piston, a cylinder, and a base cartridge. The piston is formed to be cylindrical, and is connected to a buckle via a wire which serves as a connecting member. The piston is disposed at one end side of the cylinder and is accommodated in the cylinder. The piston is movable toward the other end side of the cylinder. The intermediate portion of the wire is connected to the one end side of the cylinder and is bent back toward the cylinder. The base cartridge is a member through which the bent-back intermediate portion of the wire is inserted.

A guiding portion (entrance portion) and a gas chamber are formed so as to communicate with one another at the interior of the base cartridge through which the intermediate portion of the wire is inserted. The guiding portion is a portion through which the bent-back wire is inserted so as to be slidable in a linear direction which is coaxial with the cylinder. The gas chamber is provided between the guiding portion and the cylinder, and has a diameter which is substantially larger than that of the guiding portion. A gas generator, which is mounted to the base cartridge, communicates with the gas chamber so as to be able to supply gas thereto. The gas generator is an example of a gas generating device which, by being operated, ignites a gas generating agent so as to generate a large amount of gas.

The gas generator is operated when an acceleration sensor detects a predetermined acceleration. The piston is moved within the cylinder in the axial direction toward the other end thereof due to the pressure of the large amount of gas supplied into the cylinder. The buckle is thereby pulled-in toward the vehicle body. In order to prevent flames from leaking from the base cartridge due to the gas flowing out toward the guiding portion, packing formed from rubber is disposed between the guiding portion and the gas chamber. The wire is slidably inserted through the rubber packing.

A lap pretensioner device such as that described above presupposes a case in which a stretch-out load is applied to the webbing by the inertial movement of the vehicle occupant, before operation of the gas generator. For example, there are cases in which, at the time of a rapid deceleration of the vehicle such as a collision, the detecting of the acceleration by the acceleration sensor (i.e., the operation of the acceleration sensor) is delayed.

In a conventional lap pretensioner device, if the gas generator operates after the stretch-out load is applied to the webbing, the piston, which is connected to the webbing via the buckle and the wire, cannot move toward the other end of the cylinder. As a result, there is the concern that the high-temperature gas or flames which cannot move properly from the gas chamber may leak to the exterior from the guiding portion side through the sealed portion formed by the packing.

In order to prevent such a phenomenon from occurring, there is the need for special measures such as, for example, mounting a protective cover or the like. Such special measures lead to an increase in the cost of the lap pretensioner device. In addition, such special measures are a cause of deterioration of the mountability of the lap pretensioner device to a vehicle.

SUMMARY OF THE INVENTION

In view of the aforementioned, an object of the present invention is to provide a pretensioner device which, with a simple structure, can prevent the leakage of high-temperature gas or flames to the exterior.

In order to achieve the above-described object, a pretensioner device relating to a first aspect of the present invention is equipped with a connecting member, a piston, a cylinder, a gas chamber, an entrance portion, and a gas generating device. The pretensioner device usually either has an anchor plate, to which one end portion of a webbing for restraining a vehicle occupant is fixed, or a buckle which holds a tongue plate through which an intermediate portion of the webbing is inserted. One end portion of the connecting member is connected to the buckle. The piston is connected to the other end portion of the connecting member. The cylinder is formed in a tubular shape corresponding to the piston, and the piston is accommodated in the cylinder so as to be movable toward one side in the axial direction. The gas chamber communicates with the other side of the cylinder, and an intermediate portion of the connecting member is inserted through the gas chamber. The entrance portion is provided at the side of the gas chamber opposite the side at which the cylinder is provided. An intermediate portion of the connecting member is slidably inserted through the entrance portion. The gas generating device is provided so as to be able to supply gas to the gas chamber, and generates gas upon ignition. In a predetermined case, the pretensioner device ignites the gas generating device, and due to the gas supplied from the gas chamber into the cylinder, the pretensioner device moves the piston toward the one side of the cylinder and tenses the webbing in the direction of restraining the vehicle occupant. Further, the protecting member formed from a material having high thermal conductivity is provided within the gas chamber.

In the pretensioner device of the present invention, in a predetermined case such as at the time of a rapid deceleration of the vehicle for example, the gas generating device is ignited and generates gas and supplies the gas to the gas chamber. This gas is supplied to the cylinder which communicates with the gas chamber. Due to the pressure of this gas, the piston is moved toward the one side of the cylinder. It is preferable to provide a sealing device which impedes leakage (flowing out) of gas to the exterior from the entrance portion at this time.

In this way, a predetermined amount of movement of the anchor plate or the buckle, which is connected to the piston via the connecting member, is achieved, and the webbing is tensed in the direction of restraining the vehicle occupant such that the amount of movement of the waist portion of the vehicle occupant is reduced.

Here, the protecting member formed from a material having high thermal conductivity (e.g., a metal material such as aluminum or iron, or an alloy containing one of aluminum or iron, or the like) is provided in the gas chamber. Therefore, the high-temperature gas, which is supplied from the gas generating device to the gas chamber, contacts the protecting member, is cooled by the good thermal conductivity of the protecting member, and the temperature of the gas falls (a portion of the thermal energy of the gas is consumed by heating the protecting member).

Thus, even if, after a stretch-out load was applied to the webbing (i.e., the connecting member), the gas generating device were to be ignited and gas were to be supplied to the gas chamber in a state in which movement of the piston toward the one side of the cylinder was impeded, the gas leaking (flowing out) to the exterior from the entrance portion would be low-temperature and would not result in flames.

In this way, in the pretensioner device of the first aspect, leaking of high-temperature gas or flames to the exterior can be prevented by a simple structure.

In the pretensioner device relating to the first aspect, the protecting member may be formed in a tubular shape, and the connecting member may be inserted through the protecting member at the interior of the gas chamber.

In the pretensioner device of the present invention, when the protecting member is formed in a tubular shape and the connecting member is inserted therethrough, the surface area of the protecting member which contacts the gas can be made to be large. Moreover, the high-temperature gas supplied from the gas generating device first contacts the protecting member. In this way, the high-temperature gas is reliably cooled.

Because the protecting member covers the connecting member from the outer side, both at times of normal operation and at times of abnormal operation, the connecting member is, owing to the protecting member, not directly exposed to flames or the high-temperature gas supplied from the gas generating device. Thus, there is no fear that the strength of the connecting member will deteriorate due to high temperatures. The reliability of the pretensioner device is improved, and the connecting member can be made to have a smaller cross-sectional area (e.g., in the case of a connecting member having a circular cross-section such as a wire, the diameter of the connecting member can be made smaller).

The protecting member of the pretensioner device relating to the present invention and described above may have the following structure. The connecting member is slidably inserted through the protecting member. The protecting member has a sealing member which seals the interior of the entrance portion from the exterior. The protecting member is fixed and disposed within the gas chamber while pressing the sealing member between the protecting member and the inner surface of the entrance portion.

In this pretensioner device, when the protecting member is disposed in and fixed to the interior of the gas chamber in a state in which the protecting member presses the sealing member between the protecting member and the inner surface of the entrance portion (e.g., when at least the portion of the protecting member which presses the sealing member is disposed such that the connecting member is slidable), the sealing member is deformed (crushed) moderately, and the interior of the entrance portion is sealed from the exterior. Namely, the region between the exterior and the gas chamber which passes between the entrance portion and the connecting member is sealed. As a result, leaking of high-temperature gas from the entrance portion to the exterior can reliably be prevented.

Moreover, because the pressed end portion (end surface) of the sealing member is covered by the protecting member, the portion of the sealing member which is exposed to the gas (the gas chamber) is made smaller, and the sealability is improved even more.

Because the sealability of the sealing member is improved as described above, at times of normal operation as well, leakage of gas from the entrance portion to the exterior is prevented, and the gas reliably and efficiently moves the piston toward the one side of the cylinder. Namely, an effect of efficiently regulating the flow of the gas is obtained.

A pretensioner device relating to a second aspect of the present invention has, in addition to the same connecting member and cylinder as those of the first aspect, a gas chamber, a gas generating device, an entrance portion, and a gas discharging portion. When the gas generating device operates, gas is supplied to the gas chamber. The entrance portion is provided at the side of the gas chamber opposite the side at which the cylinder is provided. The intermediate portion of the connecting member is slidably inserted through the entrance portion. The region between the entrance portion and the connecting member is sealed by the sealing device. In a predetermined case, the pretensioner device operates the gas generating device, and due to the pressure of the gas supplied from the gas chamber into the cylinder, the pretensioner device moves the piston toward one side of the cylinder, and tenses the webbing in the direction of restraining the vehicle occupant. The gas discharging portion communicates the regions at the front and the rear of the piston.

In the pretensioner device of the second aspect of the present invention, in a predetermined case such as at the time the vehicle rapidly decelerates, the gas generating device is operated and supplies gas to the gas chamber. This gas is supplied to the cylinder which communicates with the gas chamber. Due to the pressure of this gas, the piston is moved toward the one side of the cylinder. At this time, leakage (flowing out) of gas from the entrance portion to the exterior is impeded by the sealing device.

In this way, a predetermined amount of movement of the anchor plate or the buckle, which is connected to the piston via the connecting member, is achieved, and the webbing is tensed in the direction of restraining the vehicle occupant such that the amount of movement of the waist portion of the vehicle occupant is reduced.

The effect of providing the gas discharging portion, which communicates the region ahead of and the region behind the piston (i.e., communicates the gas chamber and the one side of the cylinder with respect to the piston), is as follows. As described above, even if, in a state in which movement of the piston toward the one side of the cylinder is impeded, gas is supplied to the gas chamber and the gas pressure within the gas chamber becomes high, the gas within the gas chamber can be discharged (can leak) toward the one side of the cylinder with respect to the piston, through the gas discharging portion.

Namely, the gas within the gas chamber is discharged toward the one side of the cylinder before gas leaks from the guide portion at which the region between the guide portion and the connecting member (i.e., the exterior) is sealed by the sealing member. Or, a larger amount of gas is discharged toward the one side of the cylinder than the amount of gas which leaks from the guide portion. The gas which is discharged to the other end side of the cylinder is cooled within the cylinder and is discharged to the exterior. Therefore, leaking of high-temperature gas to the exterior can be prevented.

In the pretensioner device of the second aspect of the present invention, leaking of high-temperature gas to the exterior can be prevented by a simple structure. In particular, the leaking of flames also can be prevented if the gas generating device used in the pretensioner device of the first aspect is used.

Note that there are cases in which the gas discharging portion has a configuration and dimensions which provide a pressure loss of an extent that gas is hardly discharged or is not discharged at all (the gas is not made to pass through) at the time when the piston moves (while the piston is moving) toward the one side of the cylinder. Further, there are cases in which the gas discharging portion is structured so as to be usually closed by a valve member or the like, and is opened when the gas pressure within the gas chamber becomes a predetermined value or more. By utilizing such a structure, normal operation of the pretensioner device may be ensured.

The gas discharging portion may be formed in advance. For example, the gas discharging portion may formed by deformation of the piston or the connecting member due to high gas pressure.

Moreover, when the pretensioner device uses the above-described gas generating device, if the above-described protecting member is provided, the gas discharged from the gas discharging portion is cooled by the protecting member. Therefore, leaking of high-temperature gas or flames to the exterior can be reliably prevented. In particular, in the structure in which the protecting member presses the sealing member so as to improve the sealability between the interior and the exterior of the entrance portion, if gas is supplied to the gas chamber in the state in which movement of the piston toward the one side of the cylinder is impeded as described above, the gas within the gas chamber is reliably discharged toward the one side of the cylinder, and leaking of high-temperature gas to the exterior can be even more reliably prevented.

DESCRIPTION OF THE PREFERRED EMBODIMENTS

A lap pretensioner device 30 serving as a pretensioner device relating to an embodiment of the present invention will be described on the basis of FIGS. 1 through 5. First, the schematic structure of a seat belt device 10, to which the lap pretensioner device 30 is applied, will be described. Then, the detailed structure of the lap pretensioner device 30 will be described.

Figure 3:
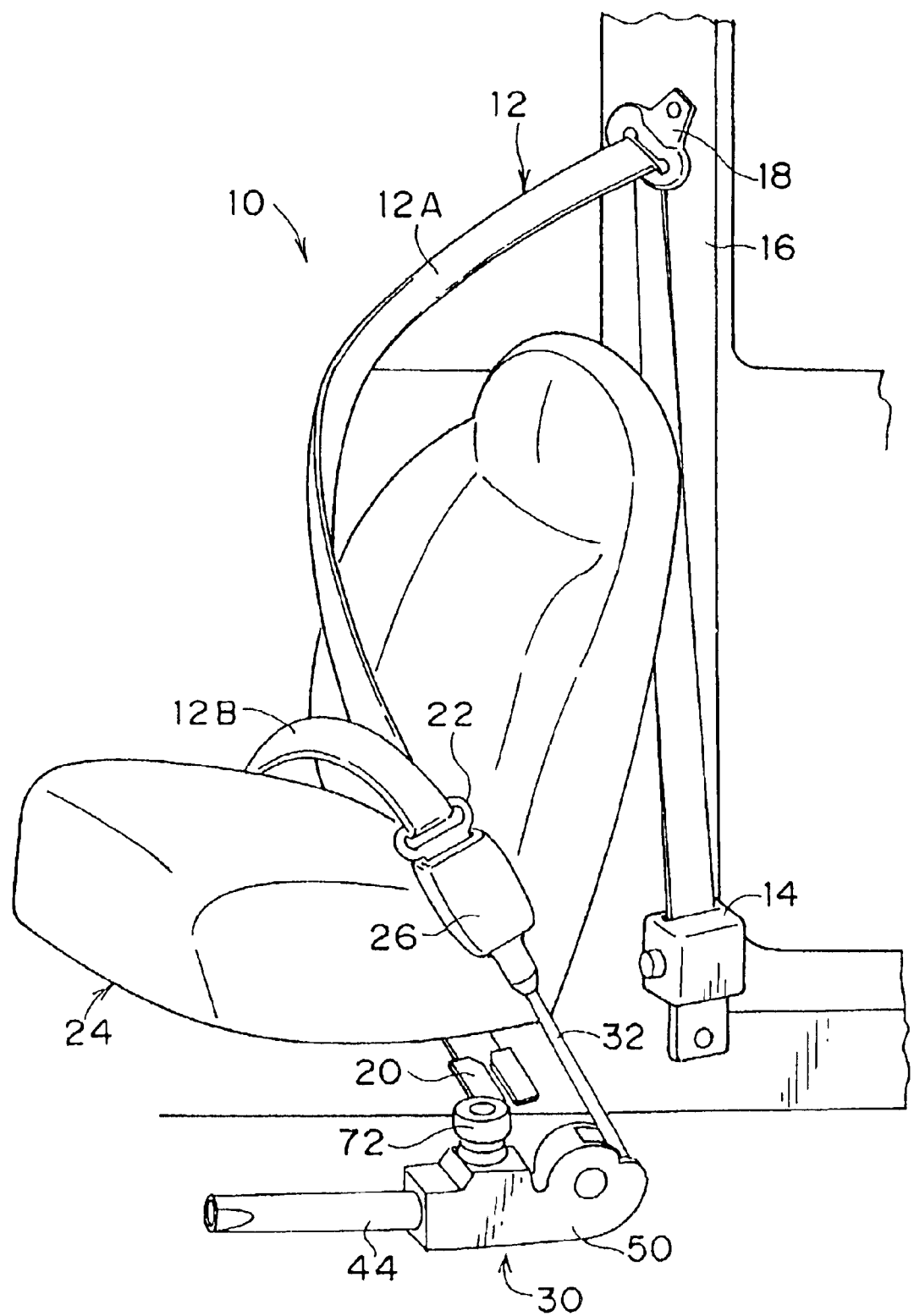
FIG. 3 is a perspective view showing the overall structure of a seat belt device to which the lap pretensioner device relating to the embodiment of the present invention is applied.

As shown in FIG. 3, the seat belt device 10 is a three-point seatbelt device, and is equipped with a webbing 12 for restraining a vehicle occupant. One end portion of the webbing 12 is anchored on a spool (not illustrated) of a retractor 14.

The retractor 14 is fixed to a position in the vicinity of the lower end of a center pillar 16 of a vehicle. The retractor 14 is usually urged in the direction of rotating to retract the webbing 12 by the urging force of a spring (not illustrated).

The intermediate portion of the webbing 12 is inserted through a through anchor 18 disposed at the upper portion of the center pillar 16, and is folded back. The other end portion of the webbing 12 is fixed to an anchor plate 20 which is fixed to a vicinity of the lower end portion of the center pillar 16. A tongue plate 22 is disposed at the intermediate portion of the webbing 12 between the through anchor 18 and the anchor plate 20, in a state in which the webbing 12 is inserted through the tongue plate 22.

The tongue plate 22 can be anchored at a buckle 26. The buckle 26 is connected to the lap pretensioner device 30. The lap pretensioner device 30 is disposed at the side of a vehicle seat 24 opposite the side at which the anchor plate 20 is provided, and will be described in detail later.

In accordance with the above-described structure, the webbing 12 is applied to a vehicle occupant as follows. The vehicle occupant pulls the tongue plate 22, and pulls the webbing 12 out from the refractor 14 against the urging force applied to a spool. Then, the vehicle occupant anchors the tongue plate 22 at the buckle 26 of the lap pretensioner device 30.

Hereinafter, details of the lap pretensioner device 30 will be described.

Figure 1:
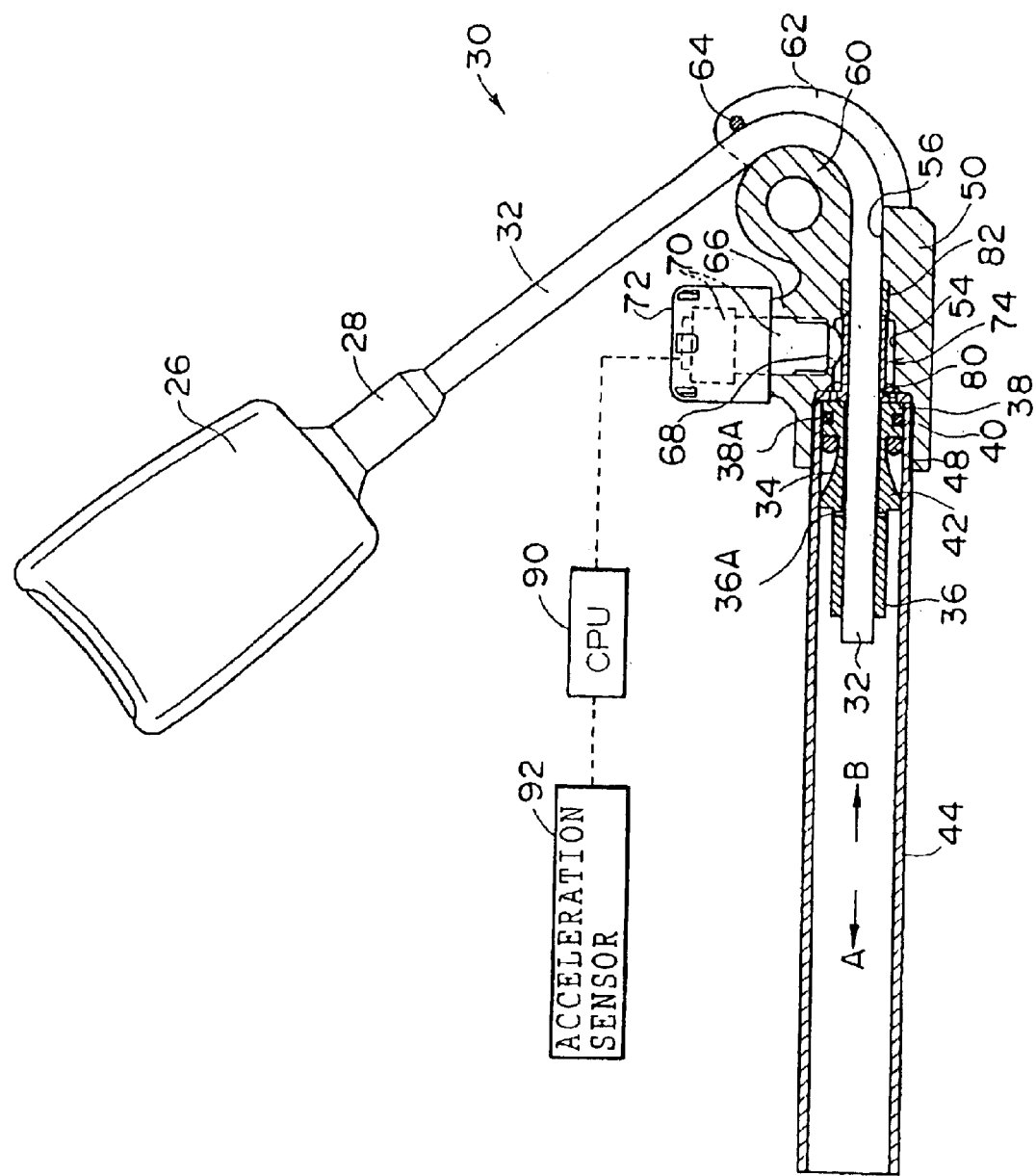
FIG. 1 is a cross-sectional view showing the overall structure of a lap pretensioner device relating to an embodiment of the present invention.

As shown in FIG. 1, the lap pretensioner device 30 has the buckle 26. As described above, the tongue plate 22 can be anchored at the buckle 26 by being inserted into the buckle 26. By pulling the tongue plate 22 in the direction opposite to the direction of insertion thereof while depressing an unillustrated anchor release button, the state in which the tongue plate 22 is anchored at the buckle 26 can be cancelled.

A wire holding portion 28 is provided at the end portion of the buckle 26 at the side opposite the side into which the tongue plate 22 is inserted. One end portion of a wire 32, which is substantially circular in cross-section and which serves as a connecting member, is fixed to the wire holding portion 28.

A piston 34 is provided at the other end portion of the wire 32. The piston 34 is formed to be tubular on the whole, and the other end portion of the wire 32 is inserted in the interior of the piston 34.

Figure 2:
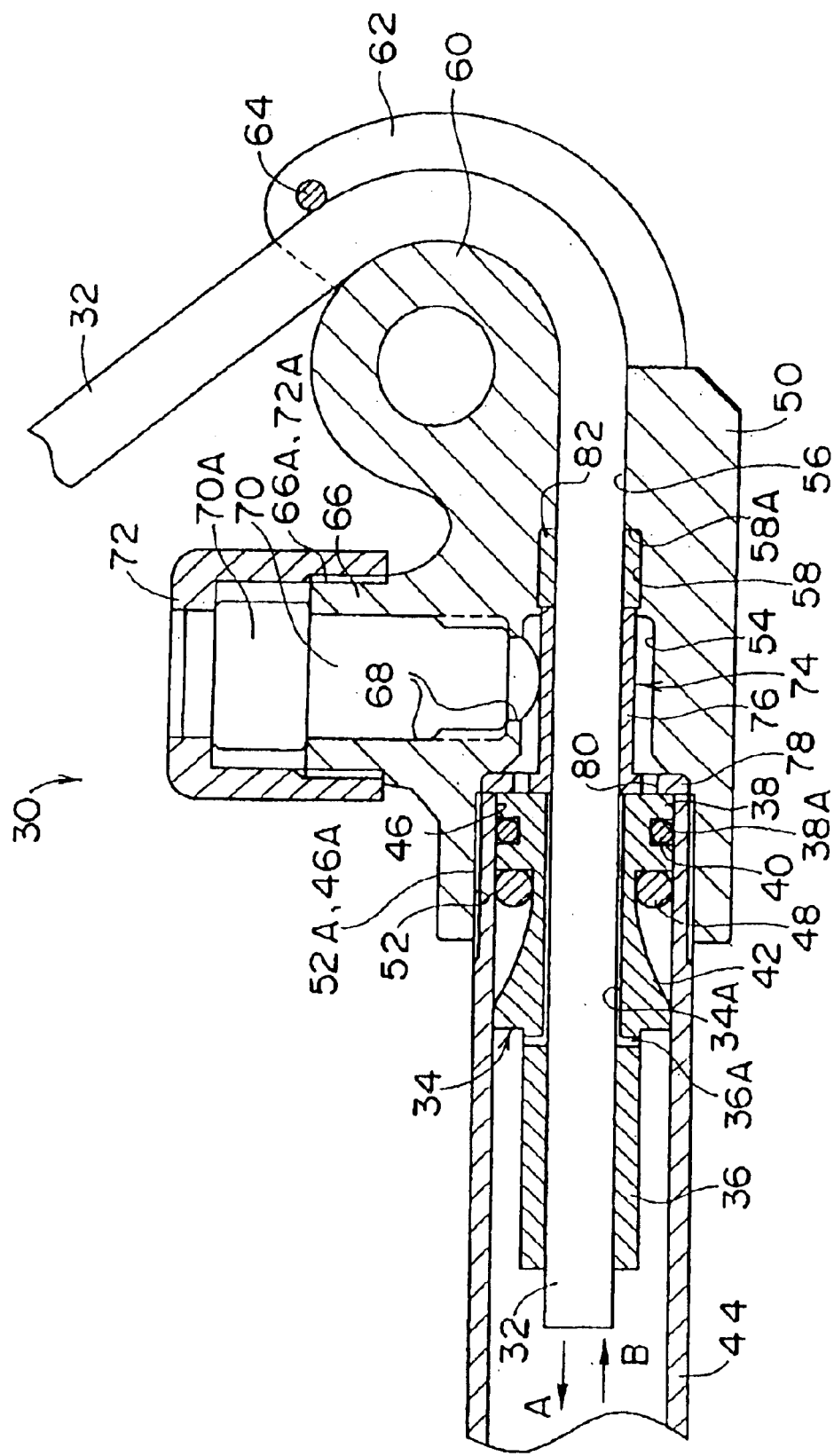
FIG. 2 is a cross-sectional view in which main portions of the lap pretensioner device relating to the embodiment of the present invention are enlarged.

As shown in detail in FIG. 2, one end portion of the piston 34 is a substantially cylindrical wire holding portion 36. The other end portion of the wire 32 is fixed and held at the wire holding portion 36 in a state of being inserted therein. The other end portion of the piston 34 is a sealing portion 38 which is substantially cylindrical and whose outer diameter is larger than the outer diameter of the wire holding portion 36. An O-ring groove 38A which holds an O-ring 40 is the sealing portion 38 is inserted in the outer peripheral portion of the sealing portion 38.

The diameter of the wire holding portion 36 side end portion of the sealing portion 38 becomes smaller in a step-like form. The portion from this smaller diameter portion to the wire holding portion 36 is a taper portion 42 whose diameter gradually becomes larger along a curve which is concave outwardly as seen in cross-section. The outer diameter of the distal end of the taper portion 42 (the wire holding portion 36 side end of the taper portion 42) is substantially the same as the outer diameter of the sealing portion 38.

The boundary portion between the taper portion 42 and the wire holding portion 36 is also formed in a step-like form. A pin hole 36A, which communicates the interior and the exterior of the wire holding portion 36, is formed in the wire holding portion 36 in a vicinity of this step portion. The piston 34 is fixed to the wire 32 only at the wire holding portion 36. A clearance 34A is formed between the outer surface of the wire 32 and the inner surfaces of the taper portion 42 and the sealing portion 38.

In this way, the region ahead of and the region behind the piston 34 communicate through the clearance 34A and the pin hole 36A. Namely, the clearance 34A and the pin hole 36A correspond to the "gas discharging portion" of the present invention. The clearance 34A and the pin hole 36A each have an extremely small cross-sectional area. Moreover, the clearance 34A has a thin, ring-shaped cross-section, and the surface area of contact of a gas, which will be described later, with the inner surface of the piston 34 and the outer surface of the wire 32 is large. In accordance with a structure having such a feature, the pressure loss (ΔP) at the time the gas passes through is large.

The piston 34 is disposed in a vicinity of a one end side opening 46 of a substantially cylindrical cylinder 44 whose both ends are open. The inner diameter of the cylinder 44 is substantially equal to the outer diameters of the distal end of the taper portion 42 and the sealing portion 38 of the piston 34. In this way, the piston 34 can move (slide) within the cylinder 44 in the axial direction thereof while the sealing portion 38 (the O-ring 40) and the distal end of the taper portion 42 slide along the inner peripheral surface of the cylinder 44.

A plurality of balls 48 are disposed between the inner peripheral surface of the cylinder 44 and a vicinity of the sealing portion 38 side end portion of the taper portion 42 (the portion where the outer diameter of the taper portion 42 is small). The diameters of the balls 48 are slightly smaller than the maximum clearance between the inner peripheral surface of the cylinder 44 and the outer peripheral surface of the taper portion 42. When the piston 34 attempts to move toward the buckle 26 (i.e., in the direction of arrow B in FIGS. 1 and 2), the balls 48 are held between the inner peripheral surface of the cylinder 44 and the outer peripheral surface of the taper portion 42.

In this way, movement of the piston 34 toward the wire holding portion 36 distal end side (i.e., in the direction of arrow A in FIGS. 1 and 2) is permitted. Moreover, movement in the direction of arrow B is restricted. Namely, even if a stretch-out load is applied to the webbing 12, the piston 34, which is connected to the webbing 12 via the tongue plate 22, the buckle 26 and the wire 32, is not moved in the direction of arrow B.

A block-shaped base cartridge 50 serving as a base member is provided between the buckle 26 and the opening 46 side end portion of the cylinder 44. A mounting hole 52 is provided at the cylinder 44 side end portion of the base cartridge 50. A female screw 52A provided at the inner peripheral surface of the mounting hole 52, and a male screw 46A formed at the outer peripheral surface of the cylinder 44 in a vicinity of the opening 46, are screwed together. The cylinder 44 is thereby held at the base cartridge 50.

A gas chamber 54, which communicates with the mounting hole 52 and which is coaxial with the cylinder 44 and whose diameter is slightly smaller than the inner diameter of the cylinder 44, is formed from the bottom portion of the mounting hole 52. The gas chamber 54 is the combustion chamber of a gas generator 70 which will be described later.

A guide hole 56, which serves as an entrance portion which opens at the end portion of the base cartridge 50 at the side opposite the cylinder 44, is provided at that end portion. The guide hole 56 is formed to be coaxial with the cylinder 44 (i.e., the gas chamber 54), and so as to have a diameter which is slightly larger than the outer diameter of the wire 32 (i.e., such that the wire 32 is slidable therein).

A packing chamber 58, which has a diameter which is between the diameters of the gas chamber 54 and the guide hole 56, is provided between the gas chamber 54 and the guide hole 56 coaxially therewith. The step portion at the boundary between the packing chamber 58 and the guide hole 56 forms a packing seat 58A. This packing seat 58A corresponds to the "inner surface of the entrance portion" of the present invention.

A circular-arc-shaped train-about portion 60 is formed above and at the outer side of the open end of the guide hole 56. In this way, in a state in which the intermediate portion of the wire is trained about the train-about portion 60 and is bent back in the axial direction of the cylinder 44, the wire 32 is inserted through the guide hole 56 and the gas chamber 54, and reaches the wire holding portion 36 of the piston 34 positioned within the cylinder 44.

A pair of guide pieces 62, which oppose one another so as to hold the wire 32 therebetween, are provided at the outer side in the radial direction of the train-about portion 60. A rod-shaped stopper member 64 (e.g., a bolt or the like fixed by an unillustrated nut) spans between the vicinities of the upper end portions of the guide pieces 62 (the train-about portion 60). In this way, the wire 32, which passes between the stopper member 64 and the train-about surface of the train-about portion 60, can be prevented from coming out of place.

A boss portion 66 is formed above the gas chamber 54 of the base cartridge 50. A mounting hole 68, which communicates with the gas chamber 54 and whose top portion is open, is provided at the interior of the boss portion 66. The gas generator 70 serving as a gas generating device is mounted in the mounting hole 68.

Specifically, in a state in which a large diameter portion 70A of the gas generator 70 abuts an end surface of the boss portion 66, the portion of the gas generator 70 from the distal end to the intermediate portion thereof is inserted in the mounting hole 68. A cap 72 is mounted to the boss portion 66 by a male screw 66A and a female screw 72A being screwed together. The large diameter portion 70A of the gas generator 70 is held (fixed) between the boss portion 66 and the cap 72. As a result, the gas generator 70 is prevented from coming out from the base cartridge 50. Moreover, leakage of gas (which will be described later) to the exterior is prevented.

The gas generator 70 accommodates, in the interior thereof, a gas generating agent which generates a large amount of gas upon combustion thereof, and an ignition device which, when operated, ignites the gas generating agent. (Both the gas generating agent and the ignition device are not illustrated.) The ignition device is electrically connected to a control device 90 (FIG. 1) disposed at an appropriate position of the vehicle. The CPU in FIG. 1 is an example of the control device 90. The control device 90 is also electrically connected to an acceleration sensor 92. When the acceleration sensor 92 senses a predetermined acceleration (deceleration), the control device 90 operates the ignition device.

A guard pipe 74 serving as a protecting member is disposed within the gas chamber 54. The guard pipe 74 has a cylindrical pipe portion 76, a disk-shaped flange portion 78 provided coaxially at the outer peripheral portion of one end of the pipe portion 76, and a plurality of through holes 80 provided in the flange portion 78.

The pipe portion 76 is formed from a material having high thermal conductivity such as a metal material such as iron or aluminum, or an alloy containing one of iron or aluminum, or the like. The longitudinal dimension of the pipe portion 76, except for the region thereof where the flange portion 78 is provided, substantially corresponds to the longitudinal dimension of the gas chamber 54. The outer diameter of the pipe portion 76 is sufficiently smaller than the inner diameter of the gas chamber 54. The inner diameter of the pipe portion 76 is formed to be slightly larger than the outer diameter of the wire 32 and such that the wire 32 can slide within the pipe portion 76.

The outer diameter of the flange portion 78 is substantially the same as the inner diameter of the mounting hole 52. In an assembled state, the respective through holes 80 are provided at positions enabling the gas chamber 54 and the cylinder 44 to communicate with one another. The flange portion 78 also may be formed of the same type of material having high thermal conductivity as the pipe portion 76.

The guard pipe 74 is structured such that the pipe portion 76 is disposed within the gas chamber 54 in a state in which the flange portion 78 is held and fixed between the bottom portion of the mounting hole 52 and the opening 46 side end surface of the cylinder 44. In this state, the flange portion 78 abuts the back surface of the sealing portion 38 of the piston 34.

A packing 82, which serves as a sealing member which seals the region between the gas chamber 54 and the guide hole 56, is provided in the base cartridge 50. The packing 82 is formed in a substantially cylindrical shape of a material having elasticity. Examples of materials having elasticity are rubber materials, synthetic rubbers containing various types of additives, synthetic resin materials, and metal materials. The outer diameter of the packing 82 is substantially the same as the outer diameter of the packing chamber 58. The inner diameter of the packing 82 is formed to be slightly larger than the outer diameter of the wire 32 and such that the wire 32 can slide in the packing 82.

The packing 82 is disposed within the packing chamber 58. The packing 82 is pressed in the axial direction between the packing seat 58A and the end surface of the pipe portion 76 of the guard pipe 74 which end surface is at the side opposite the flange portion 78. In this way, the packing 82 is contractible in the axial direction and expandable in the radial direction. Moreover, the end surface of the packing 82 can abut the end surface of the pipe portion 76 in a state of being pressed thereagainst. By setting the packing 82 in this way, the packing 82 is hardly exposed at all to the gas chamber 54.

Next, operation of the present embodiment will be described.

In the seat belt device 10 having the above-described structure, when a vehicle occupant (not illustrated) sits down in the vehicle seat 24, he/she anchors the tongue plate 22 at the buckle 26 of the lap pretensioner device 30 while pulling the tongue plate 22 and pulling the webbing 12 out from the retractor 14. In this state, a shoulder webbing 12A of the webbing 12, which is from the through anchor 18 to the tongue plate 22 (the buckle 26) restrains the upper body of the vehicle occupant. A lap webbing 12B of the webbing 12, which is from the tongue plate 22 to the anchor plate 20, restrains the waist portion of the vehicle occupant. The vehicle occupant is in a state in which the webbing 12 is properly applied to him or her. In this state, the vehicle occupant travels in the vehicle.

When the acceleration sensor 92 senses a rapid deceleration of the vehicle such as a collision for example, the control device 90 operates the ignition device of the gas generator 70. At the gas generator 70, the ignition device ignites the gas generating agent, and the gas generating agent burns with the gas chamber 54 being used as a combustion chamber, and generates a large amount of gas.

Figure 4:
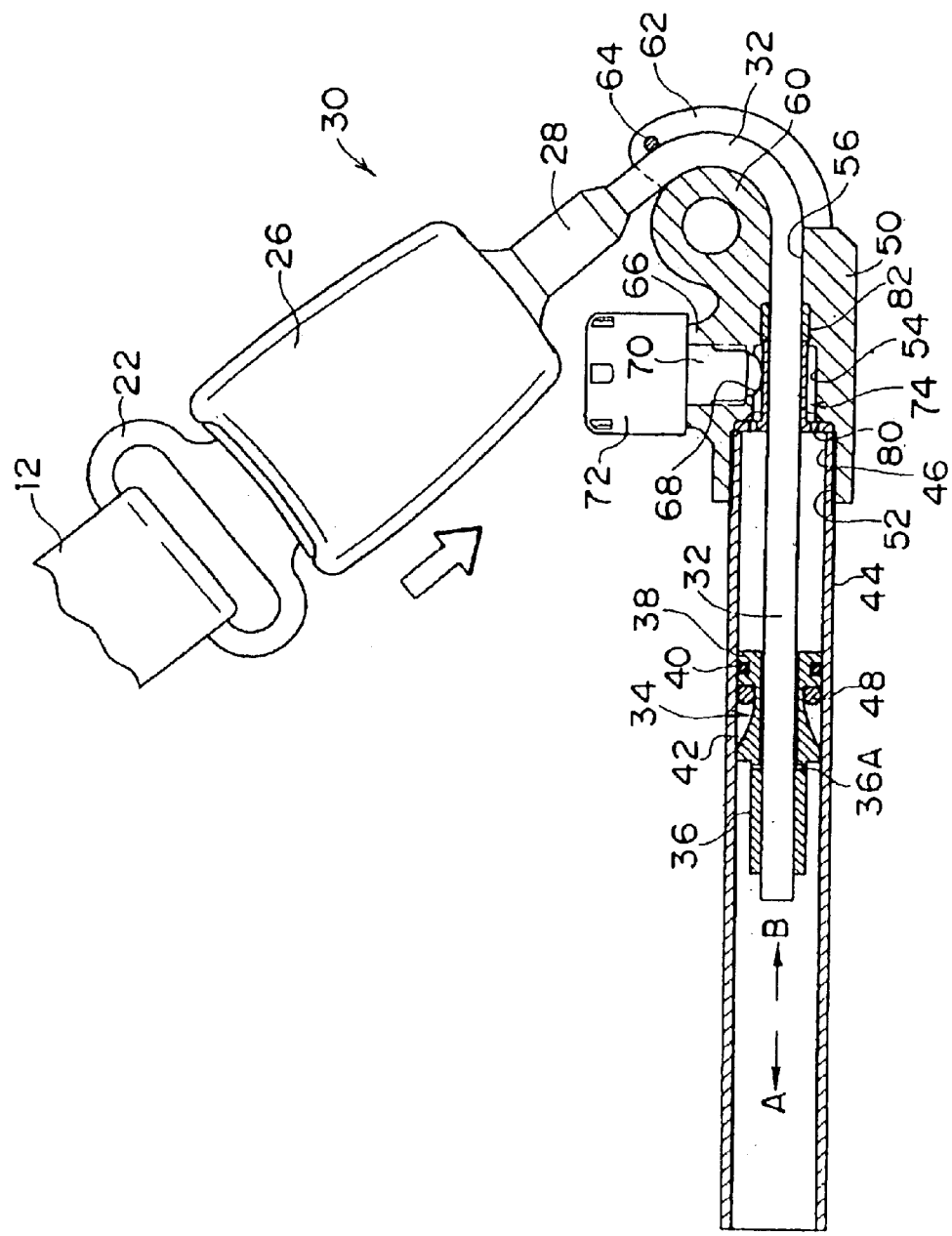
FIG. 4 is a cross-sectional view showing a state of operation of the lap pretensioner device relating to the embodiment of the present invention.
Figure 5:
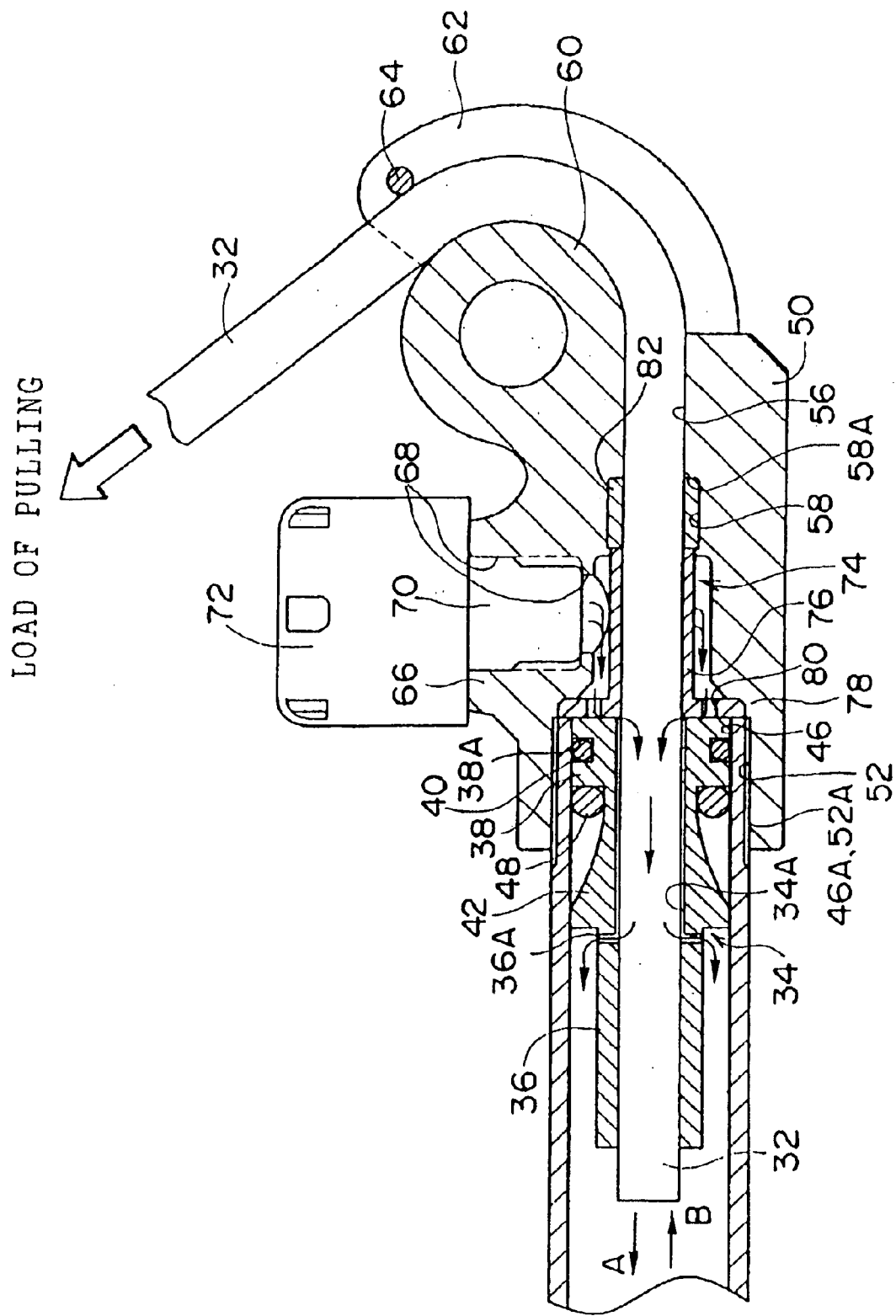
FIG. 5 is a diagram corresponding to FIG. 2 and showing the flow of gas at the time when a stretch-out load is applied to a webbing before operation of the lap pretensioner device relating to the embodiment of the present invention.

Due to the pressure of this gas, as shown in FIG. 4, the piston 34 moves in the direction of arrow A within the cylinder 44 while the distal end of the taper portion 42 and the sealing portion 38 (the O-ring 40) slide along the inner peripheral surface of the cylinder 44. Then, the buckle 26, which is connected to one end portion of the wire 32, is pulled while the wire 32, whose other end portion is fixed and held at the piston 34, slides through the guide hole 56, the packing 82, and the pipe portion 76 of the guard pipe 74.

Namely, movement of the piston 34 by a predetermined amount in the direction of arrow A is achieved, and the buckle 26, which is connected to the piston 34 via the wire 32, is pulled in by a predetermined amount such that the webbing 12 is tensed in the direction of restraining the vehicle occupant and the amount of movement of the waist portion of the vehicle occupant is reduced.

The pressure loss at the time when the gas passes through the clearance 34A and the pin hole 36A is sufficiently greater than the decrease in pressure (the pressure loss) at the time when the gas moves the piston 34 toward the arrow A side of the cylinder 44. Thus, the piston 34 is moved toward the arrow A side of the cylinder 44 (the lap pretensioner device 30 is operated correctly) by the gas pressure of the gas generated by the gas generator 70, and hardly any gas is discharged toward the arrow A side of the cylinder 44 through the clearance 34A and the pin hole 36A. Namely, the clearance 34A and the pin hole 36A do not hamper normal operation of the lap pretensioner device 30.

There are cases in which sensing is delayed, e.g., cases in which the operation of or the detection by the acceleration sensor 92 is delayed. Further, there are cases in which problems with the operation of the control device 90 arise. In cases of such trouble, a stretch-out load is applied to the webbing 12, i.e., the wire 32, by the inertial movement of the vehicle occupant which accompanies the rapid deceleration of the vehicle. When the gas generator 70 is ignited after application of the stretch-out load, i.e., at the time of abnormal operation of the lap pretensioner device 30, gas is supplied into the gas chamber 54 in the state in which movement of the piston 34 toward the arrow A side of the cylinder 44 is prevented. As a result, the gas within the gas chamber 54 becomes high-temperature and high-pressure.

The guard pipe 74 (the pipe portion 76), which serves as a protecting member and is formed from a material having high thermal conductivity, is disposed within the gas chamber 54. Therefore, the high-temperature gas supplied from the gas generator 70 to the gas chamber 54 contacts the guard pipe 74. Due to the good thermal conductivity of the guard pipe 74, the high-temperature gas is cooled and the temperature thereof is lowered. A portion of the thermal energy of the gas is consumed by heating the guard pipe 74. Thus, gas which leaks or is discharged to the exterior from the gas chamber 54 does not result in flames.

In particular, by forming the pipe portion 76 in a cylindrical shape, the surface area and volume (heat capacity) which contact the gas are made larger than in a structure in which the pipe portion 76 is merely formed in a plate shape. In addition, the high-temperature gas which is supplied from the gas generator 70 first contacts the pipe portion 76. Thus, the high-temperature gas is reliably and efficiently cooled. Moreover, in a structure in which the flange portion 78 as well is formed from a material having good thermal conductivity, at the guard pipe 74 on the whole, the surface area and volume which contact the high-temperature gas increase, and the high-temperature gas can be cooled even more reliably and efficiently.

The region in front of and the region in back of the piston 34, i.e., the gas chamber 54 and the portion of the cylinder 44 further toward the arrow A side than the piston 34, communicate with one another by the clearance 34A and the pin hole 36A. Thus, the gas within the gas chamber 54 (the gas which has been cooled by the guard pipe 74) is discharged (leaks) toward the arrow A side of the cylinder 44 through the clearance 34A and the pin hole 36A, as shown by the arrows in FIG. 5.

Thus, the gas in the gas chamber 54 is discharged toward the arrow A side of the cylinder 44, before gas leaks to the exterior from the guide hole 56 where the region between the guide hole 56 and the gas chamber 54 is sealed by the packing 82. Or, gas of an amount greater than the gas which leaks to the exterior from the guide hole 56 is discharged toward the arrow A side of the cylinder 44.

The gas which is discharged toward the arrow A side of the cylinder 44 is further cooled within the cylinder 44 and is discharged to the exterior, and leaking of high-temperature gas to the exterior is even more reliably prevented. Accordingly, even if the cooling of the gas by the guard pipe 74 were to be insufficient, leaking of high-temperature gas or flames to the exterior is prevented.

In this way, in the lap pretensioner device 30 relating to the present embodiment, with a simple structure, it is possible to prevent the leaking of high-temperature gas or flames to the exterior at the time of abnormal operation of the lap pretensioner device 30. In particular, the high-temperature and high-pressure gas within the gas chamber 54 at the time of abnormal operation of the lap pretensioner device 30 is discharged into the cylinder 44 through the clearance 34A and the pin hole 36A while being cooled by the guard pipe 74. Leakage of high-temperature gas and flames to the exterior from the guide hole 56 can thereby reliably be prevented.

Further, the guard pipe 74 presses the end surface of the packing 82 such that the packing 82 seals the region between the gas chamber 54 and the guide hole 56 in a state in which the packing 82 is deformed (crushed) moderately. Thus, leakage of high-temperature gas from the guide hole 56 to the exterior is reliably prevented. (Leaking of low-temperature gas also is prevented or suppressed.) Moreover, the packing 82 is covered by the guard pipe 74, and the surface area of the end surface of the packing 82 which is exposed to the gas chamber 54 is reduced. Therefore, the portion of the packing 82 which is exposed to high-temperature gas is reduced, and the sealability of the packing 82 is further improved.

Because the sealability of the packing 82 is improved as described above, at times of normal operation as well, leaking of gas from the guide hole 56 to the exterior is prevented, and the gas can reliably and efficiently move the piston 34 toward the arrow A side of the cylinder 44. Namely, an efficient effect of regulating the flow of the gas is obtained by the guard pipe 74.

Moreover, the pipe portion 76 of the guard pipe 74 is formed in a cylindrical shape and covers the wire 32 from the outer side. Therefore, both at times of normal operation and at times of abnormal operation, owing to the pipe portion 76, the wire 32 is not directly exposed to flames or high-temperature gas supplied from the gas generator 70. Thus, there is no fear that the strength of the wire 32 will deteriorate due to high temperatures. The reliability of the lap pretensioner device 30 is improved, and the wire 32 can be made to have an even smaller diameter.

Note that, in the above-described embodiment, the lap pretensioner device 30 has a structure in which the buckle 26, which holds the tongue plate 22 through which the intermediate portion of the webbing 12 is inserted, is pulled in. However, the present invention is not limited to the same. For example, the lap pretensioner device 30 may be structured such that, instead of the buckle 26, the anchor plate 20 is fixed to the one end portion of the wire 32, and the anchor plate 20 is therefore pulled in.

The above-described embodiment introduced, as an example, a structure in which the guard pipe 74, which has the cylindrical pipe portion 76, is provided as the protecting member. It suffices that the protecting member relating to the present invention is formed from a material having high thermal conductivity and is provided within the gas chamber 54 (a case in which the protecting member is provided beneath the mounting hole 68 is one example), and the protecting member is not limited to the configuration described above. Accordingly, for example, the lap pretensioner device 30 may be provided with a plate-shaped or semi-cylindrical protecting member. Moreover, the present invention is not limited to a structure in which the protecting member or the guard pipe 74 is disposed in a state of pressing the packing 82 which serves as the sealing member.

Moreover, the above-described embodiment illustrates a structural example in which, in the lap pretensioner device 30, the high-pressure gas within the gas chamber 54 at the time when the lap pretensioner device 30 operates abnormally is discharged to the open side of the cylinder 44 (the side further toward the arrow A side than the piston 34) through the clearance 34A between the piston 34 and the wire 32. However, the present invention is not limited to the same. The lap pretensioner device 30 may have a structure in which the clearance 34A is not provided between the piston 34 and the wire 32 (i.e., the gas is not discharged toward the arrow A side of the cylinder 44).

In the lap pretensioner device 30 which is structured such that the high-pressure gas within the gas chamber 54 at the time of abnormal operation is discharged to the open side of the cylinder 44 through the clearance 34A between the piston 34 and the wire 32, it is possible to not provide the guard pipe 74 as the protecting member. The gas generating device in this case is not limited to a type which generates gas by burning a gas generating agent.

Further, although the clearance 34A is formed in advance between the piston 34 and the wire 32 in the above-described embodiment, the present invention is not limited to the same. For example, the clearance 34A may be formed by the wire 32 deforming due to high gas pressure within the gas chamber 54 at the time of abnormal operation of the lap pretensioner device 30.

The present invention is not limited to a structure provided with the clearance 34A and the pin hole 36A as the gas discharging portion. For example, it is possible to provide a discharge path which serves as the gas discharging portion and which passes through the piston in the longitudinal direction. Moreover, the gas discharging portion may be structured such that is usually closed by a valve or a rupture disk or the like, and is opened (communicates the region ahead and the region behind the piston 34) by movement of the valve or rupturing of the rupture disk when the gas pressure within the gas chamber 54 reaches a predetermined value or greater. In these cases, the piston 34 is not limited to a structure in which the wire holding portion 36 is disposed at the leading side in the direction of movement.

In the above-described embodiment, the buckle 26 and the piston 34 are connected via the wire 32 which is bent back at the train-around portion 60 of the base cartridge 50. However, the present invention is not limited to the same. For example, the buckle 26 and the piston 34 may be connected via a rectilinear connecting member or a connecting member having a cross-sectional configuration other than circular (e.g., a plate-shaped member or a rod-shaped member).

Moreover, although the arrow A side end portion of the cylinder 44 is open in the above-described embodiment, the present invention is not limited to the same. For example, the arrow A side end portion of the cylinder 44 may be closed, and an air bleeder hole which enables movement of the piston 34 may be provided in the closed portion or in a side surface of the cylinder 44. Further, it is possible to provide a discharge path which guides the air or the gas discharged from the air bleeder portion (e.g., the gas discharged through the clearance 34A) to a position which is more safe for the vehicle occupant, e.g., to the exterior of the vehicle.

As described above, a pretensioner device pertaining to the present invention reliably prevents high-temperature gas or flames from leaking to the exterior.

What is claimed is:

1. A pretensioner device comprising:
    a connecting member, one end portion of the connecting member being operatively connected to a webbing for restraining a vehicle occupant;
    a piston connected to another end portion of the connecting member;
    a cylinder formed in a tubular shape corresponding to the piston and accommodating the piston such that the piston is movable toward one side in an axial direction;
    a gas chamber which communicates with another side of the cylinder, and through which an intermediate portion of the connecting member is inserted;
    an entrance portion provided at a side of the gas chamber opposite to a side at which the cylinder is provided, an intermediate portion of the connecting member being slidably inserted through the entrance portion;
    a gas discharging portion including a bleeder opening freely connecting a region ahead of and behind the piston, said bleeder opening being sufficiently small in cross section so as not to interfere with the moving of the piston from the gas pressure during a normal operation of the pretensioner device;
    a gas generating device provided so as to be able to supply gas to the gas chamber, and generating gas by being ignited,
    and, in a predetermined case, the pretensioner device igniting the gas generating device, and due to pressure of gas supplied into the cylinder from the gas chamber, the pretensioner device moving the piston toward the one side of the cylinder and tensing the webbing in a direction of restraining a vehicle occupant,
    wherein a protecting member, at least a portion of which is formed from a thermally conductive material, is disposed within the gas chamber.

2. The pretensioner device of claim 1, wherein the protecting member is formed in a tubular shape, and the connecting member is inserted through the protecting member at an interior of the gas chamber.

3. The pretensioner device of claim 2, wherein the pretensioner device includes a sealing member through which the connecting member is slidably inserted and which seals an interior of the entrance portion from an exterior, and
    the protecting member is fixed to and disposed in the gas chamber while pressing the sealing member between the protecting member and an inner surface of the entrance portion.

4. The pretensioner device of claim 3, wherein the cylinder includes an opening, and the pretensioner device further includes, between a side end portion of the opening of the cylinder and a buckle connected to the webbing, a base cartridge which holds the cylinder, and the sealing member is disposed at the base cartridge.

5. The pretensioner device of claim 4, wherein the entrance portion includes a guide hole, and the sealing member includes packing which seals a region between the gas chamber and the guide hole.

6. The pretensioner device of claim 5, wherein the packing is formed in a substantially cylindrical shape and of a material having elasticity, and the packing includes an inner diameter which is larger than the connecting member.

7. The pretensioner device of claim 5, wherein the pretensioner device further includes, between the gas chamber and the guide hole, a packing chamber which is provided coaxially with the gas chamber and the guide hole, and the packing chamber includes a diameter of a magnitude between a diameter of the gas chamber and a diameter of the guide hole, and the packing is disposed within the packing chamber, and the packing is pressed in a longitudinal axial direction by a pipe portion of a guard pipe at a side opposite to a flange portion.

8. The pretensioner device of claim 1, wherein the connecting member is a wire, and the piston includes a substantially cylindrical wire holding portion, and the other end portion of the wire is fixed and held in a state of being inserted in the wire holding portion.

9. The pretensioner device of claim 1, wherein the gas generating device includes a gas generator and a control device which can control ignition, and the gas generator includes an ignition device, and the ignition device is electrically connected to the control device.

10. The pretensioner device of claim 1 wherein the protecting member includes a guard pipe, and the guard pipe includes a cylindrical pipe portion, a flange portion provided at one end of the pipe portion substantially coaxially with the pipe portion, and a plurality of through holes provided in the flange portion.

11. The pretensioner device of claim 10, wherein a longitudinal dimension of the pipe portion of the guard pipe substantially corresponds to a longitudinal dimension of the gas chamber, and the pipe portion includes an outer diameter which is smaller than an inner diameter of the gas chamber, and an inner diameter which is larger than the connecting member.

12. The pretensioner device of claim 10, wherein the pipe portion of the guard pipe is formed of a metallic material.

13. The pretensioner device of claim 12, wherein the flange portion of the guard pipe also is formed of a metallic material.

14. A pretensionser device comprising:
a connecting member, one end portion of the connecting member being operatively connected to a webbing for restraining a vehicle occupant;
a piston connected to another end portion of the connecting member;
a cylinder formed in a tubular shape corresponding to the piston, and accommodating the piston such that the piston is movable toward one side in an axial direction;
a gas generating device provided so as to be able to supply gas, and generating gas upon being ignited;
a gas chamber which communicates with another side of the cylinder and through which an intermediate portion of the connecting member is inserted, and when the gas generating device operates, gas is supplied to the gas chamber;
an entrance portion provided at a side of the gas chamber opposite a side at which the cylinder is provided, and an intermediate portion of the connecting member is slidably inserted through the entrance portion, and a region between the connecting member and the entrance portion is sealed by a sealing member; and
a gas discharging portion including a bleeder opening freely connecting a region ahead of the piston and a region behind the piston,
wherein, in a predetermined case, the pretensioner device operates the gas generating device, and due to pressure of gas supplied into the cylinder from the gas chamber, the pretensioner device moves the piston toward the one side of the cylinder and tenses the webbing in a direction of restraining a vehicle occupant, and the opening of the gas discharge portion is sufficiently small in cross section so as not to interfere with the moving of the piston from the gas pressure during a normal operation of the pretensioner device.

15. The pretensioner device of claim 14, wherein the connecting member is a wire, and the piston includes a substantially cylindrical wire holding portion, and the other end portion of the wire is fixed and held in a state of being inserted in the wire holding portion.

16. The pretensioner device of claim 14, wherein the piston includes a substantially cylindrical sealing portion at one end of the piston, a reduced diameter portion adjacent to the sealing portion, a taper portion adjacent to the reduced diameter portion and whose diameter gradually increases, and a holding portion adjacent to the taper portion and holding the connecting member, and a boundary between the taper portion and the holding portion is formed in a form of a step, and the holding portion includes a pin hole, and the gas discharging portion includes the pin hole.

17. The pretensioner device of claim 16, wherein a clearance is formed between the taper portion and the connecting member and between the sealing portion and the connecting member, and the gas discharging portion includes the clearance.

18. The pretensioner device of claim 14, wherein the gas generating device includes a gas generator and a control device which can control ignition, and the gas generator includes an ignition device, and the ignition device is electrically connected to the control device.

19. The pretensioner device of claim 14, wherein the entrance portion includes a guide hole, and the sealing member includes packing which seals a region between the gas chamber and the guide hole.

20. The pretensioner device of claim 19, wherein the packing is formed in a substantially cylindrical shape and of a material having elasticity, and the packing includes an inner diameter which is larger than the connecting member.

21. The pretensioner device of claim 14, wherein the cylinder includes an opening, and the pretensioner device further includes, between a side end portion of the opening of the cylinder and a buckle connected to the webbing, a base cartridge which holds the cylinder, and the sealing member is disposed at the base cartridge.

* * * * *